US007726692B2

(12) United States Patent
Ozaki et al.

(10) Patent No.: US 7,726,692 B2
(45) Date of Patent: Jun. 1, 2010

(54) STEERING HANDLE AND STEERING SYSTEM

(75) Inventors: Takafumi Ozaki, Saitama (JP); Paul Baron, Saitama (JP); Kazuhiko Satou, Saitama (JP); Tatsuya Amano, Saitama (JP); Hisao Asaumi, Saitama (JP); Masaaki Kawano, Saitama (JP); Hirokazu Kitazawa, Saitama (JP); Kunio Shirakawa, Saitama (JP); Osamu Tsurumiya, Saitama (JP); Yoshinobu Mukai, Saitama (JP); Kazuhisa Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 712 days.

(21) Appl. No.: 10/580,920

(22) PCT Filed: Oct. 21, 2004

(86) PCT No.: PCT/JP2004/015586

§ 371 (c)(1),
(2), (4) Date: Feb. 22, 2007

(87) PCT Pub. No.: WO2005/054032

PCT Pub. Date: Jun. 16, 2005

(65) Prior Publication Data

US 2007/0221007 A1    Sep. 27, 2007

(30) Foreign Application Priority Data

Dec. 1, 2003 (JP) ............................. 2003-401470
Apr. 12, 2004 (JP) ............................. 2004-116872

(51) Int. Cl.
*B62D 1/12* (2006.01)
*B62D 1/04* (2006.01)

(52) U.S. Cl. ............................. 280/778; 74/543; 463/37

(58) Field of Classification Search ................. 280/771, 280/778; 74/492, 498, 543–557; 463/36–38, 463/47; 273/148 B; *B62D 12/001*
See application file for complete search history.

(56) References Cited

U.S. PATENT DOCUMENTS 3,196,709 A * 7/1965 Bickford ...................... 74/557

(Continued)

FOREIGN PATENT DOCUMENTS

EP       1350706 A1 * 10/2003

(Continued)

*Primary Examiner*—Paul N Dickson
*Assistant Examiner*—Drew Brown
(74) *Attorney, Agent, or Firm*—Carrier, Blackman & Associates, P.C.; Joseph P. Carrier; William D. Blackman

(57) ABSTRACT

In a steering handle grasped and rotated by both hands of a driver, an axis of a steering shaft included in the steering handle is inclined so as to be higher in level in a forward direction of a vehicle body, and a left grip grasped by a left hand and a right grip grasped by a right hand are rotatable in opposite directions about an axis perpendicular to the axis of the steering shaft. Accordingly, an upper half of the driver's body sitting on a seat and leaning backwards and a plane of rotation of the steering handle are substantially parallel to each other, thereby ensuring that the driver can rotate the steering handle without stretching and withdrawing his or her arms. Moreover, when the steering handle is rotated, the driver's wrists can be prevented from being twisted unnaturally, leading to an easy steering operation.

11 Claims, 11 Drawing Sheets

U.S. PATENT DOCUMENTS

| | | | |
|---|---|---|---|
| 3,312,123 A * | 4/1967 | Rumpf | 74/494 |
| 3,669,465 A * | 6/1972 | Vacante | 280/731 |
| 4,641,849 A * | 2/1987 | De Cortanze | 280/270 |
| 6,343,526 B2 * | 2/2002 | Reicks et al. | 74/557 |
| 6,442,462 B1 * | 8/2002 | Nishizaki et al. | 701/41 |
| 7,007,769 B2 * | 3/2006 | Hara et al. | 180/402 |
| 7,147,080 B2 * | 12/2006 | Higashi et al. | 180/315 |
| 7,421,925 B2 * | 9/2008 | Korzan et al. | 74/492 |

FOREIGN PATENT DOCUMENTS

| | | |
|---|---|---|
| JP | 058427 | 5/1975 |
| JP | 52-005119 | 1/1977 |
| JP | 52-044924 | 4/1977 |
| JP | 60-142164 | 9/1985 |
| JP | 62-036869 | 2/1987 |
| JP | 63-128178 | 8/1988 |
| JP | 06-059763 | 3/1994 |
| JP | 06-080084 | 3/1994 |
| JP | 06-092241 | 4/1994 |
| JP | 11-048985 | 2/1999 |
| JP | 11-227614 | 8/1999 |
| JP | 11-342849 | 12/1999 |
| JP | 2000-016305 | 1/2000 |
| JP | 2003-291821 | 10/2003 |
| JP | 2004-175217 | 6/2004 |
| JP | 2005225384 A * | 8/2005 |
| JP | 2006056468 A * | 3/2006 |
| JP | 2007045413 A * | 2/2007 |
| WO | WO 8809279 A1 * | 12/1988 |

* cited by examiner

STEERING HANDLE AND STEERING SYSTEM

TECHNICAL FIELD

The present invention relates to a steering handle for carrying out steering by rotating the steering handle about an axis of a steering shaft, the steering handle being grasped by both hands of an occupant sitting on a seat. The present invention also relates to a steering system, comprising left and right operating members grasped and operated by left and right hands of an occupant, actuators for steering, and control means for controlling the operation of the actuators in response to the operation of the operating members.

BACKGROUND ART

There is a circular steering handle known from the following Patent Document 1, which is mounted to a steering shaft, a portion of which is cut off, and which includes a knob supported in the cut-off region for rotation about a rotational axis parallel to the steering shaft, so that the steering handle is rotated by grasping the knob by one hand of a driver without changing the grasping of the steering handle.

Patent Document 1: Japanese Patent Application Laid-open No. 11-227614

DISCLOSURE OF THE INVENTION

Problems to be Solved by the Invention

A circular steering handle conventionally commonly used for a vehicle is mounted at a rear end of a steering shaft which is inclined so that it is lower in level in a forward direction of a vehicle body. For this reason, distances from an upper part of a body of a driver sitting on a seat of the vehicle to various portions of the steering handle are not constant, and the distance to an upper portion of the steering handle is larger, while the distance to a lower portion of the steering handle is smaller. Therefore, when the driver sitting on the seat of the vehicle grasps and rotates the steering handle, it is necessary for the driver to stretch and withdraw his or her arms. This is an unnatural movement for the driver, resulting in an increase in burden on the steering operation. Moreover, in the conventional steering handle, when the steering handle is rotated, driver's wrists are twisted unnaturally. This also causes an increase in burden on the steering operation conducted by the driver.

The present invention has been accomplished with the above-described circumstances in view, and it is an object of the present invention to provide a steering handle and a steering system, in which no burden is imposed on an occupant's arms and wrists during steering operation.

Means for Solution of Problems

To achieve the above object, according to a first aspect and feature of the present invention, there is proposed a steering handle for carrying out steering by rotating the steering handle about an axis of a steering shaft, the steering handle being grasped by both hands of an occupant sitting on a seat, characterized in that the axis of the steering shaft is inclined so as to be higher in level in a forward direction.

According to a second aspect and feature of the present invention, there is proposed a steering handle for carrying out steering by rotating the steering handle about an axis of a steering shaft, the steering handle being grasped by both hands of an occupant sitting on a seat, characterized in that the steering handle includes a left grip grasped by a left hand, and a right grip grasped by a right hand, the left grip and the right grip are rotatable about an axis perpendicular to the axis of the steering shaft.

According to a third aspect and feature of the present invention, in addition to the second feature, there is proposed a steering handle, wherein the left grip and the right grip are connected to each other by an interlocking mechanism so as to be rotated in opposite directions from each other.

According to a fourth aspect and feature of the present invention, in addition to the third feature, there is proposed a steering handle, wherein the interlocking mechanism is formed by a left bevel gear fixed to the left grip, a right bevel gear fixed to the right grip, and an idler bevel gear meshed simultaneously with the left bevel gear and the right bevel gear.

According to a fifth aspect and feature of the present invention, there is proposed a steering system, comprising left and right operating members grasped and operated by left and right hands of an occupant, actuators for steering, and control means for controlling the operation of the actuators in response to the operation of the operating members, characterized in that a locus of movement of each of the operating members by the operation provided by the occupant is on a spherical plane about the position of each of the occupant's elbows.

According to a sixth aspect and feature of the present invention, there is proposed a steering system, comprising left and right operating members grasped and operated by left and right hands of an occupant, actuators for steering, and control means for controlling the operation of the actuators in response to the operation of the operating members, characterized in that the operating members, when being moved upwards from their neutral positions, are moved in a direction toward the occupant.

According to a seventh aspect and feature of the present invention, there is proposed a steering system, comprising left and right operating members grasped and operated by left and right hands of an occupant, actuators for steering, and control means for controlling the operation of the actuators in response to the operation of the operating members, characterized in that the left and right operating members is rotatable about their left and right rotational axes, while being rotated about a rotational axis, the left and right rotational axes being inclined to spread in a V-shape toward the occupant.

First and second steering actuators 14 and 17 in each of embodiments correspond to the actuators of the present invention; left and right grips 24L and 24R in the embodiment correspond to the operating members of the present invention; a first steering shaft 28 in the embodiment corresponds to the steering shaft of the present invention; and first and second steering actuator electronic control units Ua and Ub in the embodiment correspond to the control means of the present invention.

EFFECT OF THE INVENTION

With the first feature, the axis of the steering shaft is inclined so that it is higher in level in the forward direction of the vehicle body when the steering handle grasped by the both hands of the occupant is rotated about the axis of the steering shaft and hence, the distance between the steering handle and an upper half of the occupant's body sitting on the seat and leaning backwards is maintained substantially constant at any rotated position of the steering handle, thereby ensuring that the occupant can rotate the steering handle without stretching and withdrawing his or her arms, leading to an easy steering operation.

With the second feature, the left grip and the right grip of the steering handle are rotatable about the axis perpendicular to the axis of the steering shaft and hence, when the steering handle is rotated, the occupant's wrists can be prevented from being twisted unnaturally, leading to an easy steering operation.

With the third feature, the left grip and the right grip are connected to each other by the interlocking mechanism and can be rotatable in opposite directions from each other and hence, it is possible to ensure a further easy steering operation for the occupant.

With the fourth feature, the interlocking mechanism is formed by the left bevel gear fixed to the left grip, the right bevel gear fixed to the right grip, and the idler bevel gear meshed simultaneously with the left bevel gear and the right bevel gear. Therefore, the left and right grips can be rotated automatically in opposite directions in a simple structure.

With the fifth feature, when the occupant grasps and operates the left and right operating members by his left and right hands, the operating members are moved on a spherical plane about positions of the occupant's elbows. Therefore, it is possible for the occupant to conduct the steering operation without moving the positions of his or her elbows, leading to the alleviation of a burden on the operation.

With the sixth feature, when the occupant grasps and operates the left and right operating members by his left and right hands, the operating members are moved in a direction toward the occupant, as they are moved upwards from their neutral positions. Therefore, it is possible for the occupant to conduct the steering operation without moving the positions of his elbows, leading to the alleviation of a burden on the operation.

With the seventh feature, when the occupant grasps and operates the left and right operating members by his left and right hands, the operating members are rotated about their rotational axes spreading in a V-shape toward the occupant, while being rotated about a rotational axis. Therefore, it is possible for the occupant to conduct the steering operation without moving the positions of his or her elbows, leading to the alleviation of a burden on the operation, and moreover, the occupant's wrists can be prevented from being twisted unnaturally, leading to the further alleviation of the burden on the operation.

DESCRIPTION OF CHARACTERS AND NUMERALS

14 First steering actuator (actuator)
17 Second steering actuator (actuator)
23 Steering handle
24L Left grip (operating member)
24R Right grip (operating member)
27L Left bevel gear
27R Right bevel gear
28 First steering shaft (steering shaft)
29 Idler bevel gear
30 Interlocking mechanism
33 Seat
A Rotational axis
AL Rotational axis
AR Rotational axis
Lg Axis perpendicular to axis of steering shaft
Ls Axis of steering shaft
O Position of an occupant's elbow
S Spherical plane
Us First steering actuator electronic control unit (control means)
Ub Second steering actuator electronic control unit (control means)

BEST MODE FOR CARRYING OUT THE INVENTION

The mode for carrying out the present invention will now be described by way of embodiments of the present invention shown in the accompanying drawings.

Embodiment 1

FIGS. 1 to 5 show a first embodiment of the present invention.

Figure 1:
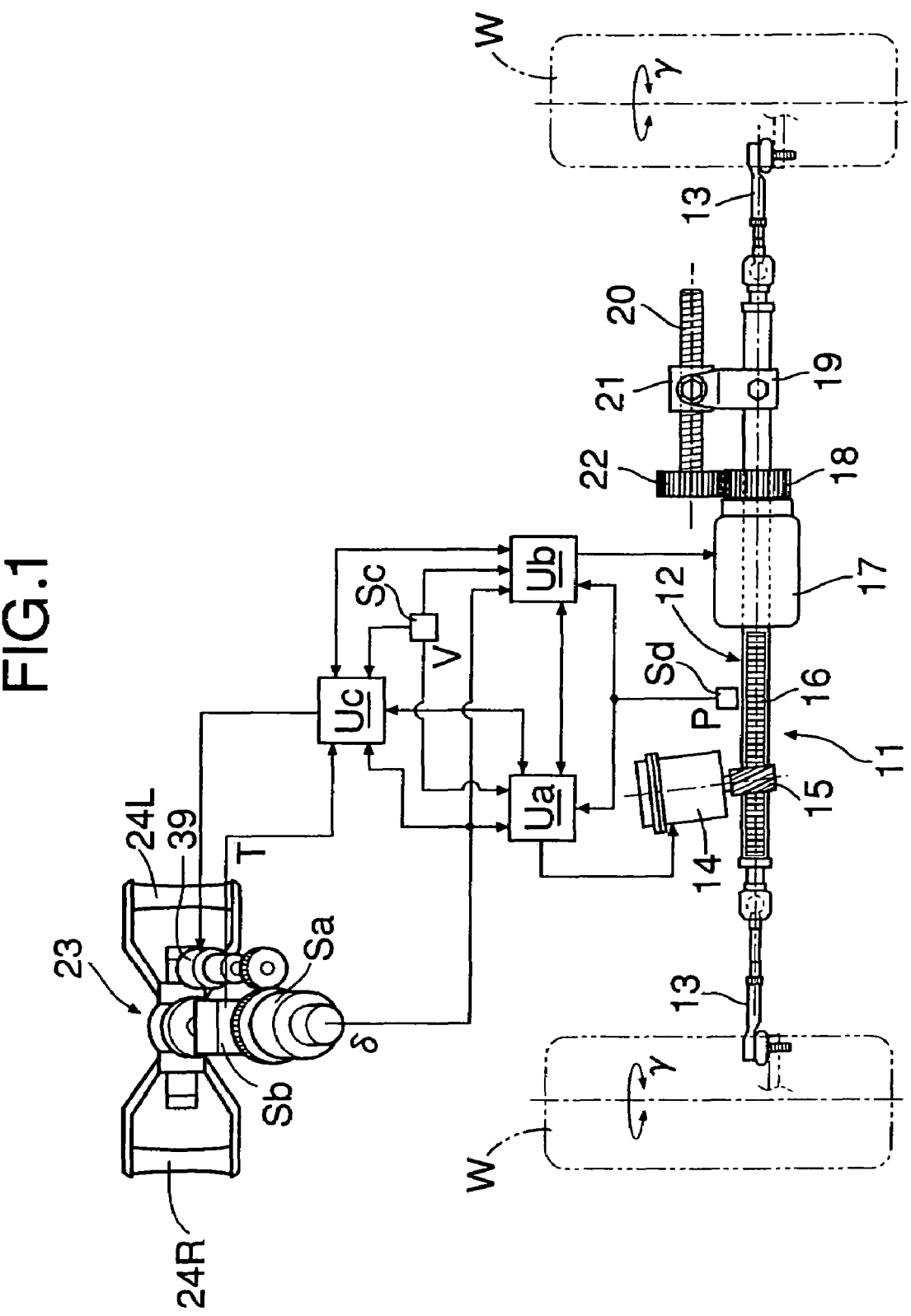
FIG. 1 is an illustration of the entire arrangement of a steering system for a vehicle according to a first embodiment. (Embodiment 1)

As shown in FIG. 1, a steering gear box 11 for steering wheels W, W of an automobile includes a rack bar 12 slidable in a lateral direction of a vehicle body. The rack bar 12 is connected at its opposite ends to the left and right wheels W, W through left and right tie rods 13, 13, respectively. A pinion 15 rotated by a first steering actuator 14 comprising an electric motor is meshed with a rack 16 formed on the rack bar 12, and when the first steering actuator 14 is driven, the rack bar 12 is slid in the lateral direction of the vehicle body through the pinion 15 and the rack 16, thereby steering the left and right wheels W, W through the tie rods 13, 13.

A second steering actuator 17 comprising an electric motor and an annular driving gear 18 rotated by the actuator 17 are disposed to surround an outer periphery of the rack bar 12. An external thread member 21 is meshed with an internal thread member 20 supported on a bracket 19 fixed to the rack bar 12, and a driven gear 22 provided at one end of the external thread member 21 is meshed with the driving gear 18. Therefore, when the second steering actuator 17 is driven, the rotation of the driving gear 18 is transmitted through the driven gear 22 to the external thread member 21, and the internal thread member 20 meshed with the rotated external thread member 21 is moved in the lateral direction of the vehicle body, whereby the rack bar 12 is slid in the lateral direction of the vehicle body to steer the left and right wheels W, W.

Figure 2:
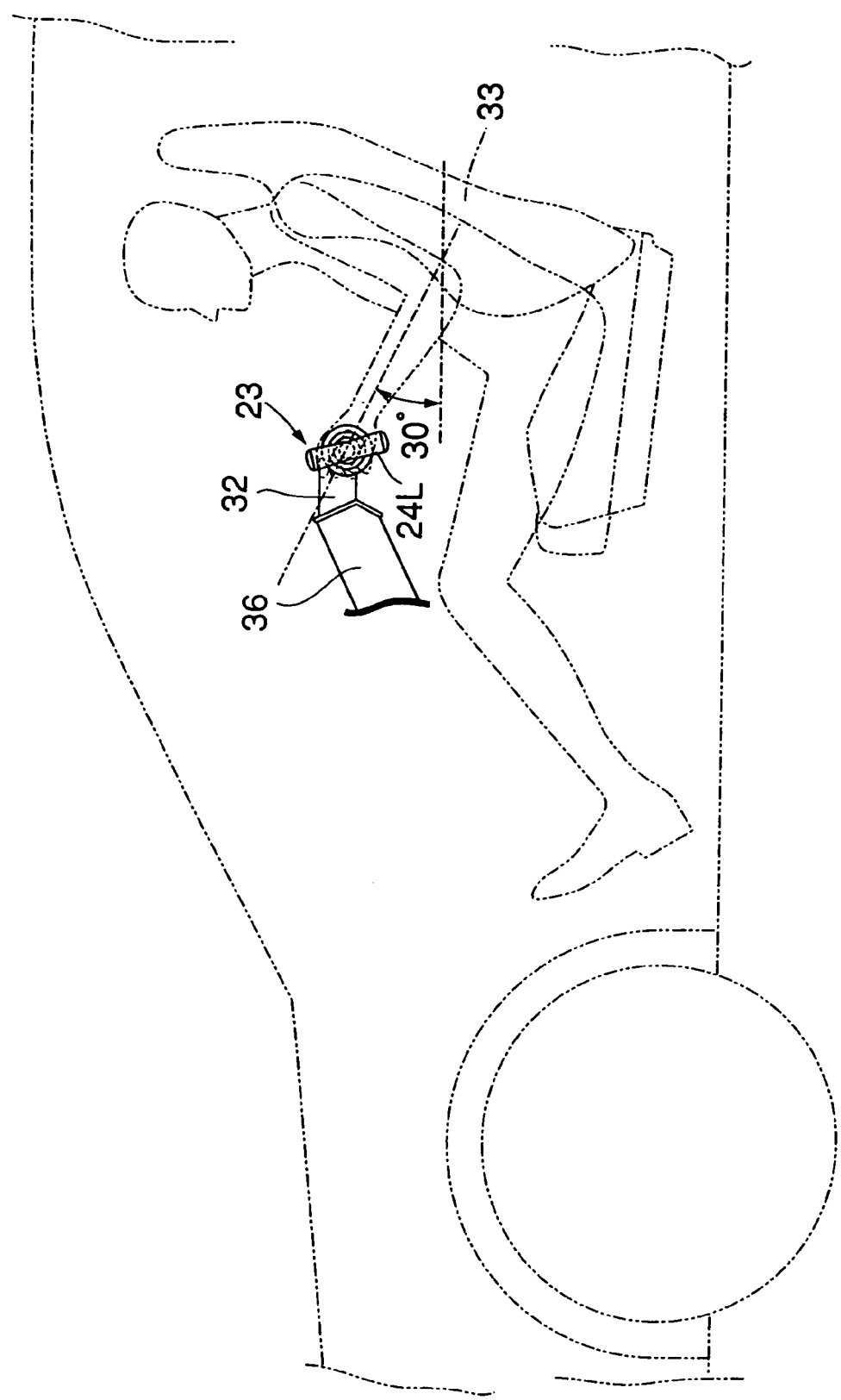
FIG. 2 is a side view of a front area of the vehicle. (Embodiment 1)
Figure 3:
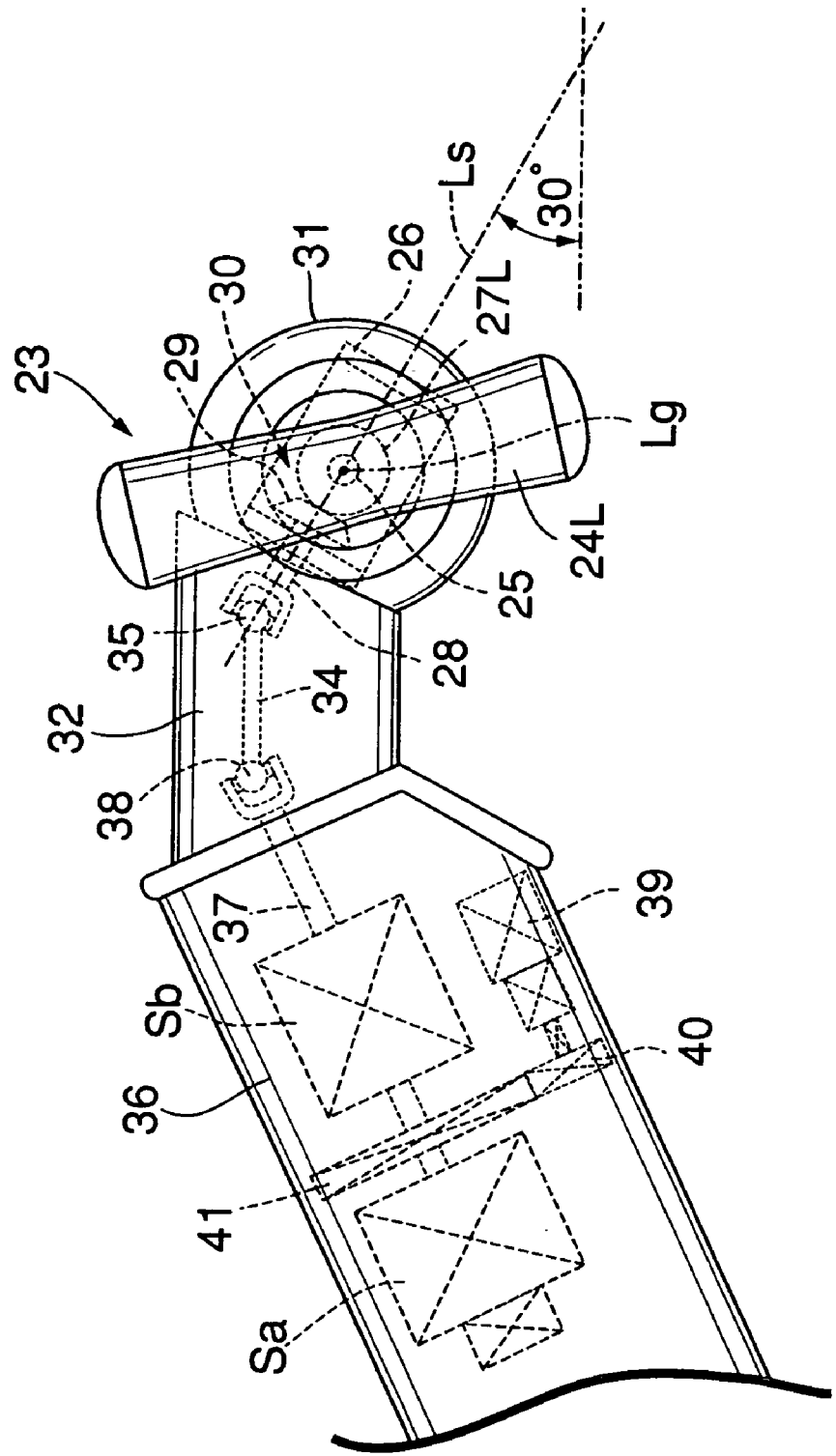
FIG. 3 is an enlarged view of essential portions of FIG. 2. (Embodiment 1)
Figure 4:
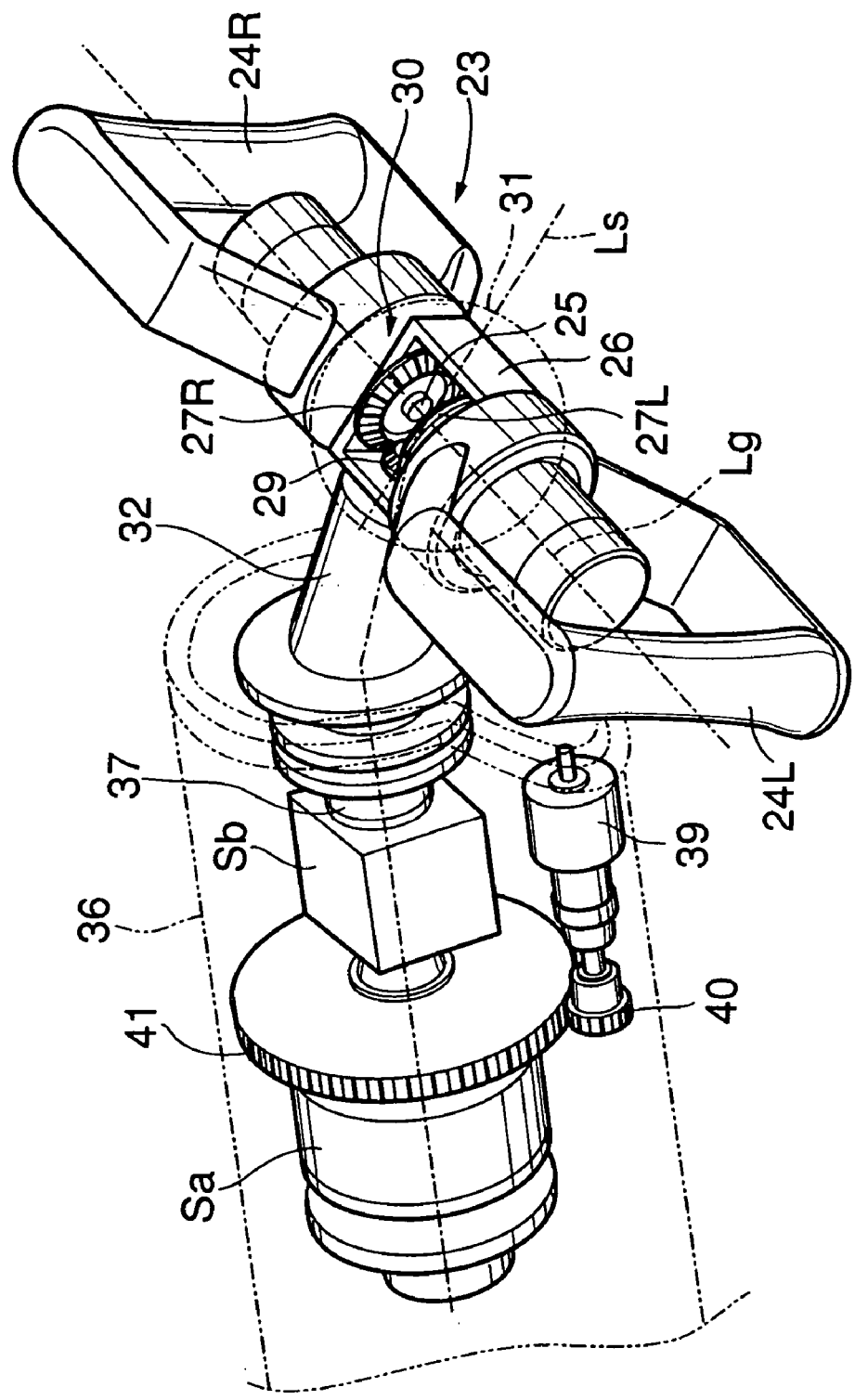
FIG. 4 is a perspective view corresponding to FIG. 3. (Embodiment 1)
Figure 5:
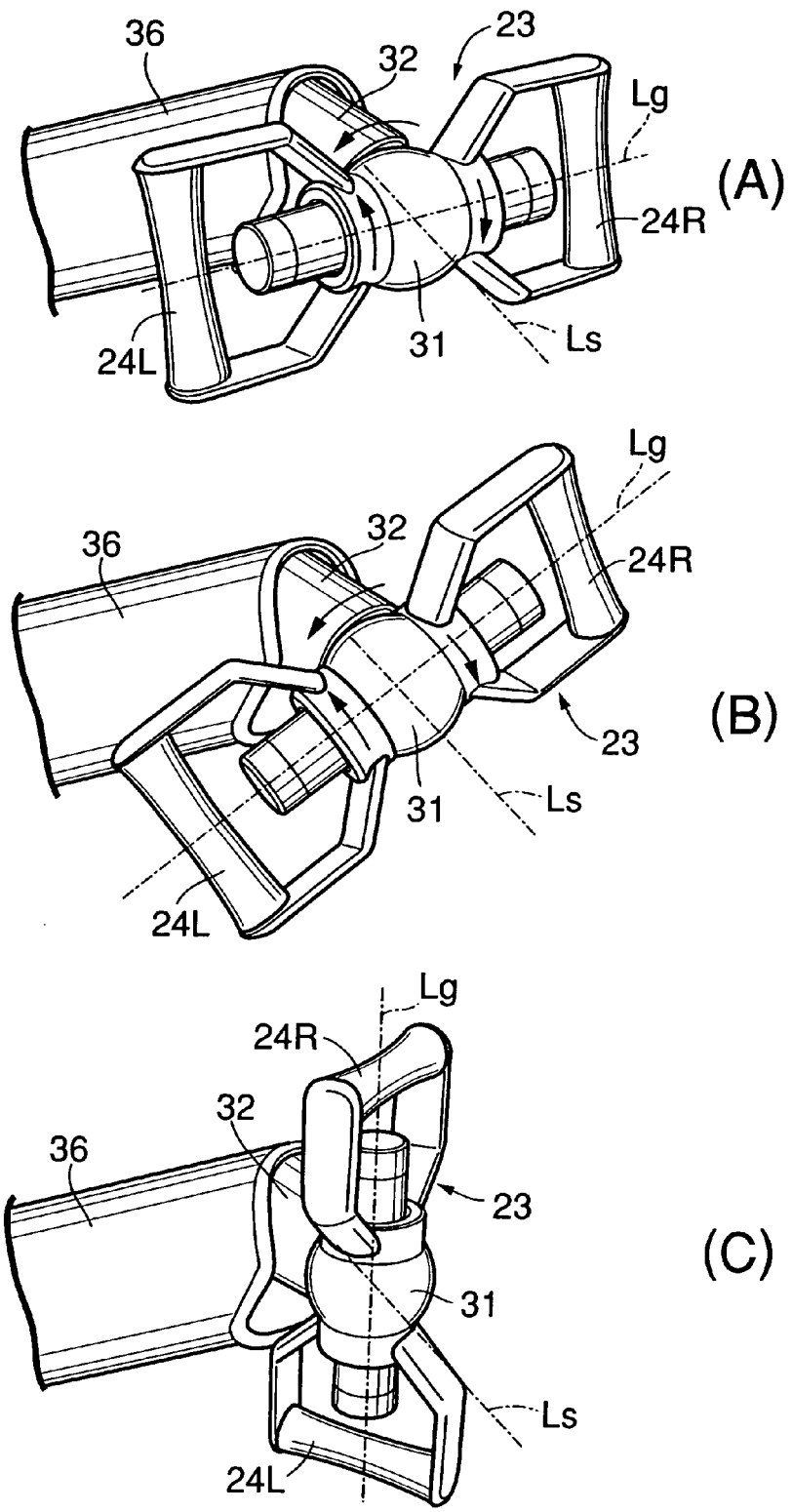
FIG. 5 is views for explaining the operation upon operation of a handle in a leftward turning direction. (Embodiment 1)
Figure 6:
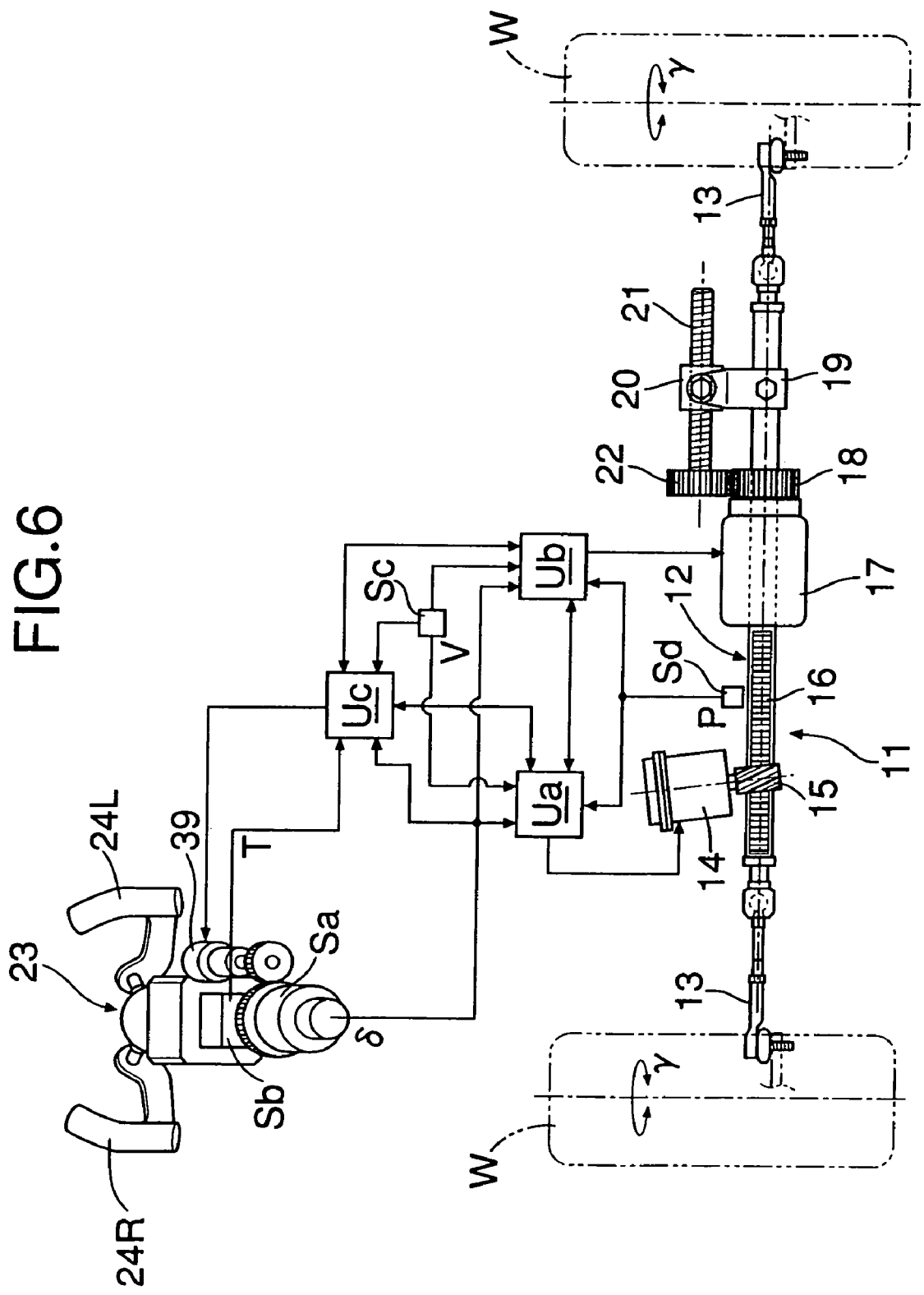
FIG. 6 is an illustration of the entire arrangement of a steering system for a vehicle according to a second embodiment. (Embodiment 2)
Figure 7:
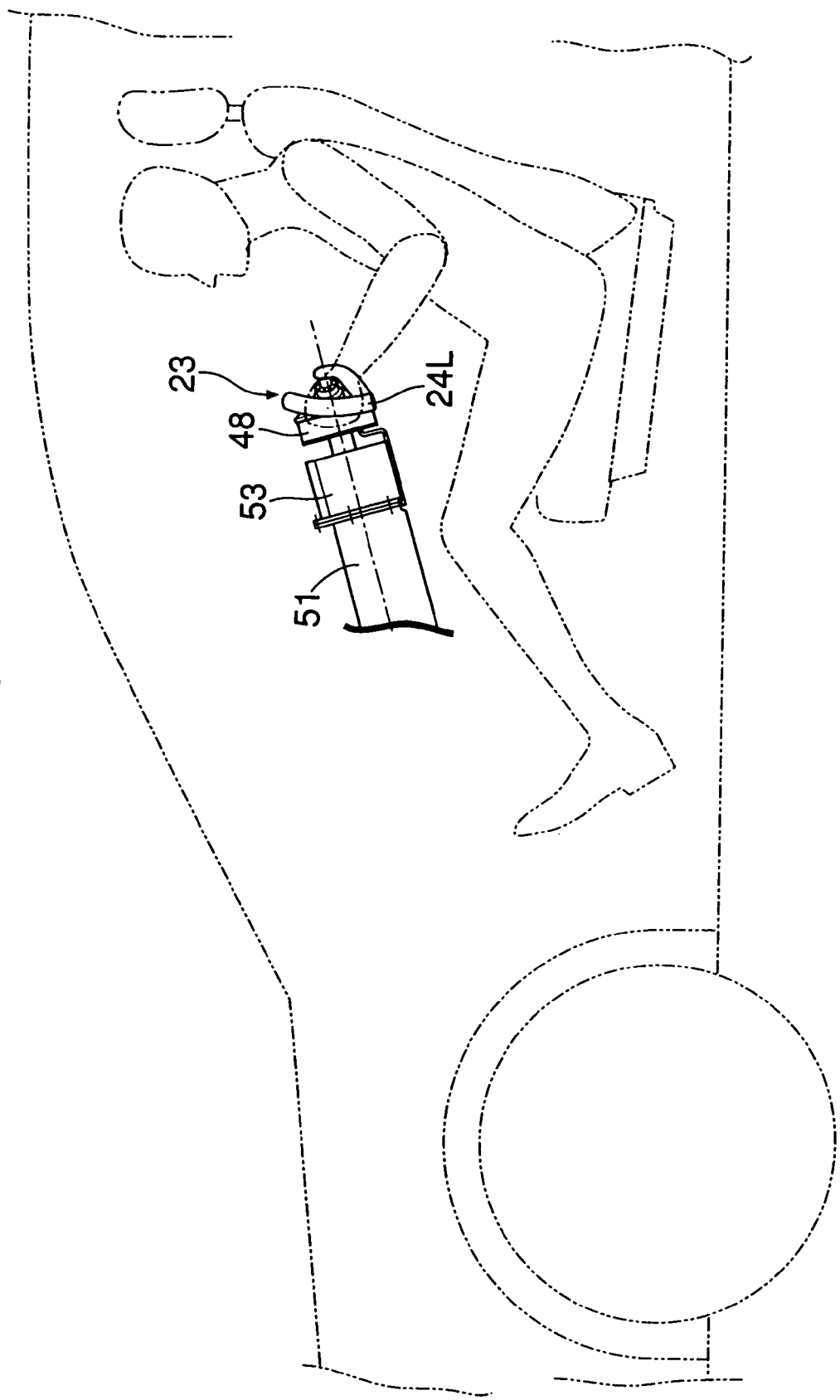
FIG. 7 is a side view of a front area of the vehicle. (Embodiment 2)
Figure 8:
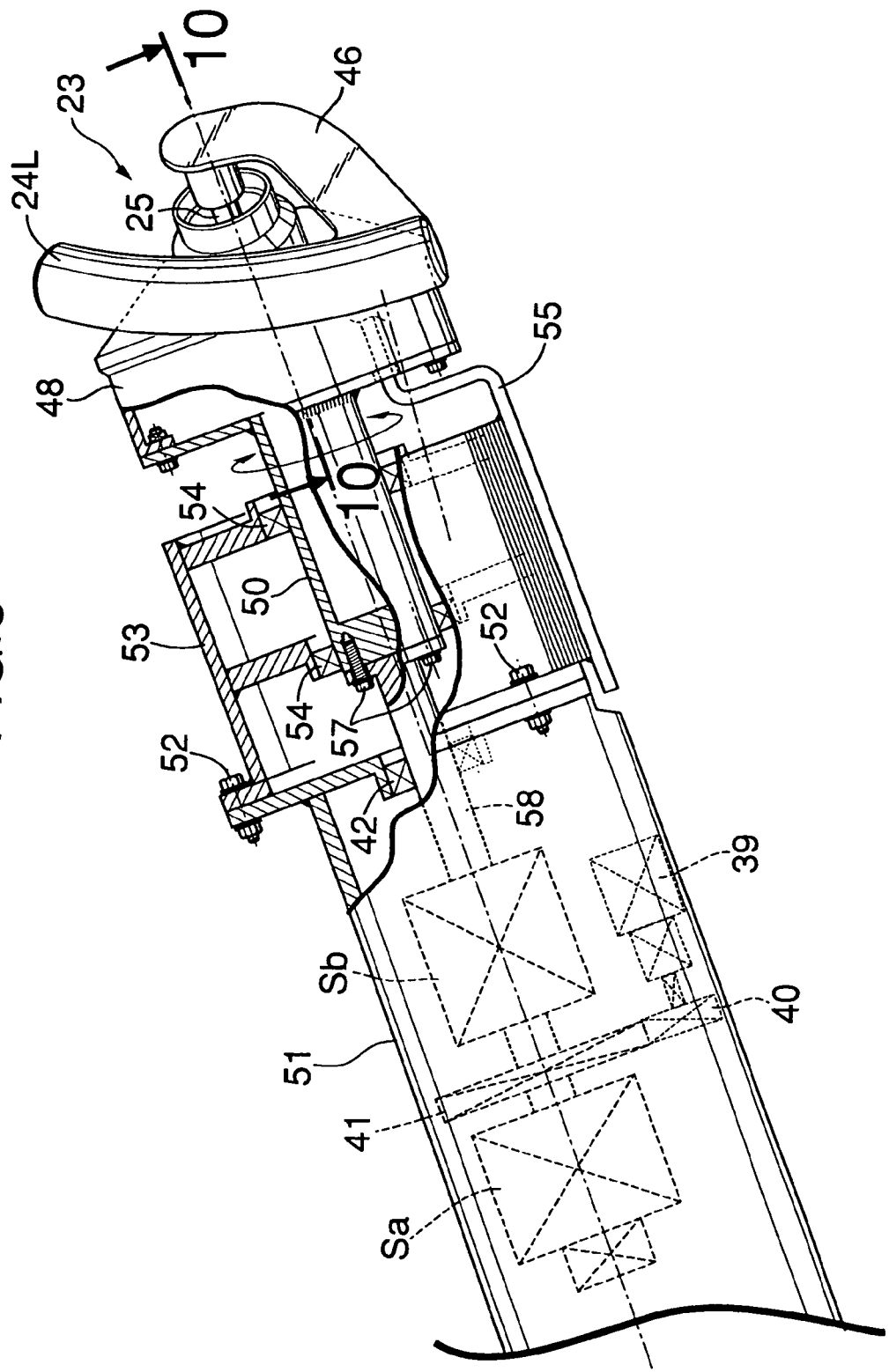
FIG. 8 is an enlarged view of essential portions of FIG. 7. (Embodiment 2)
Figure 9:
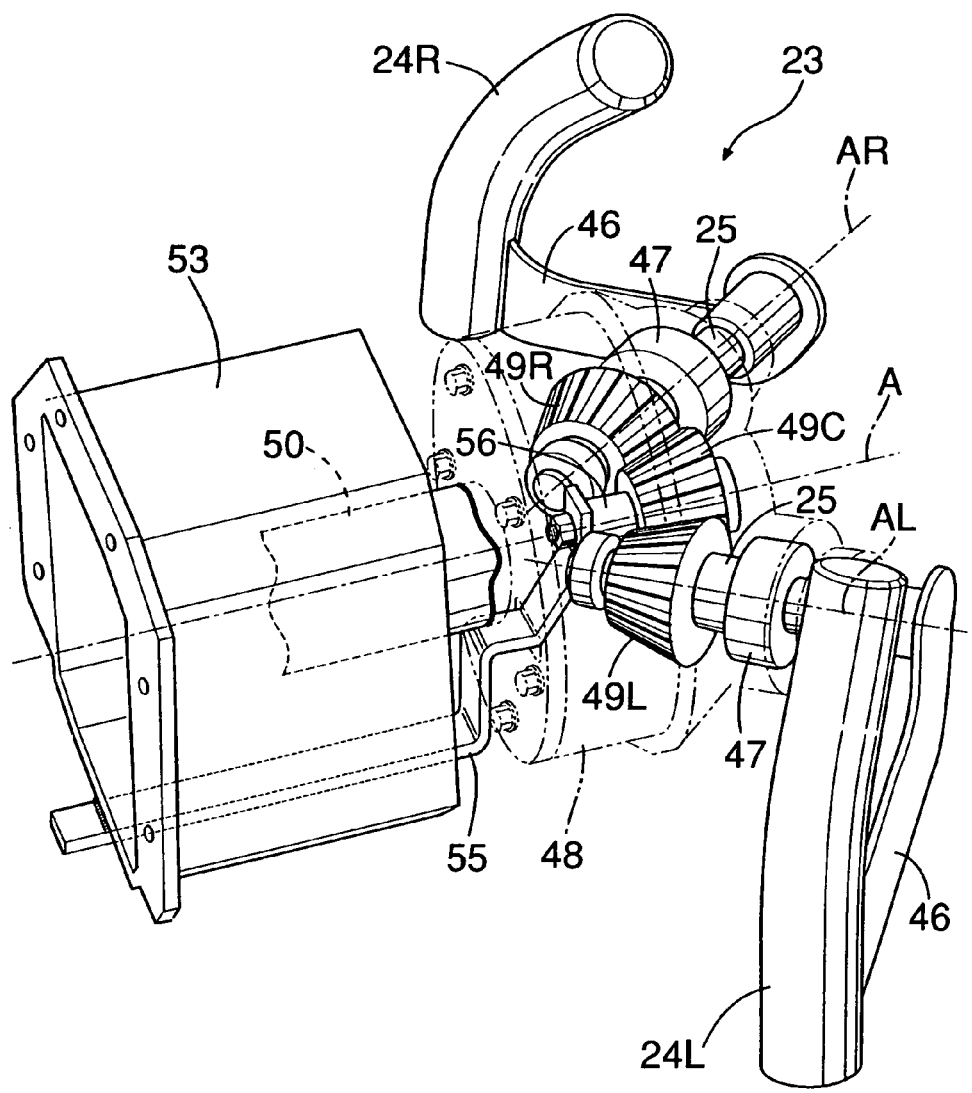
FIG. 9 is a perspective view corresponding to FIG. 8. (Embodiment 2)

As shown in FIGS. 2 to 4, a steering handle 23 includes a left grip 24L grasped by a left hand of a driver, and a right grip 24R grasped by a right hand of the driver. The left and right grips 24L and 24R are rotatably supported on a frame-shaped housing 26 by left and right rotary shafts 25, 25 disposed on a common axis Lg. Left and right bevel gears 27L and 27R are fixed to opposed ends of the left and right rotary shafts 25, 25, respectively, and meshed with a common idler bevel gear 29 relatively rotatably supported on the first steering shaft 28 (see FIG. 3) to which the housing 26 is fixed. The left and right bevel gears 27L and 27R and the idler bevel gear 29 form an interlocking mechanism 30, by which the left and right grips 24L and 24R are rotated in opposite directions in operative association with each other. The housing 26 and the interlocking mechanism 30 are covered with a spherical cover member 31.

The left and right grips 24L and 24R are biased toward neutral positions shown in FIG. 4 by springs which are not shown.

The first steering shaft 28 integrally fixed to the housing 26 is rotatably supported in a rear column cover 32. An axis Ls of the first steering shaft 28 is disposed to ascend forwards at a predetermined angle (at 30° in the embodiment), so that it is higher in level in a forward direction of the vehicle body. The axis Ls is substantially perpendicular to an upper half of a driver's body sitting in a backward leaning attitude on a seat 33. The common axis Lg of the left and right grips 24L and 24R is perpendicular to the axis Ls of the first steering shaft 28.

A second steering shaft 34 rotatably supported in the rear column cover 32 is connected at its rear end to a front end of the first steering shaft 28 through a universal joint 35, and a third steering shaft 37 rotatably supported in a front column cover 36 connected to a front portion of the rear column cover 32 is connected at its rear end to a front end of the second steering shaft 34 through a universal joint 38.

A steering angle sensor Sa for detecting a steering angle δ input to the steering handle 23 by the driver is mounted at a front end of the third steering shaft 37, and a steering torque sensor Sb for detecting a steering torque T input to the steering handle 23 by the driver is mounted at an intermediate portion of the third steering shaft 37. A steerage reaction force-generating means 39 is also mounted at the intermediate portion of the third steering shaft 37. The steerage reaction force-generating means 39 provides a pseudo steerage reaction force to the steering handle 23 by an electric motor or a hydraulic pressure, and the direction and magnitude of the steerage reaction force can be controlled to any values by the meshing of a driving gear 40 provided on an output shaft with a follower gear 41 provided on the third steering shaft 37.

The operation of the first steering actuator 14 is controlled by a first steering actuator electronic control unit Ua; the operation of the second steering actuator 17 is controlled by a second steering actuator electronic control unit Ub; and the operation of the steerage reaction force-generating means 39 is controlled by a steerage reaction force-generating means electronic control unit Uc.

A steering angle δ detected by the steering angle sensor Sa, a vehicle speed V detected by a vehicle speed sensor Sc and a rack position P detected by a rack position sensor Sd are input to the first and second steering actuator electronic control units Ua and Ub, and the steering angle δ detected by the steering angle sensor Sa, a steering torque T detected by the steering torque sensor Sb and the vehicle speed V detected by the vehicle speed sensor Sc are input to the steerage reaction force-generating means electronic control unit Uc.

The operation of the first embodiment having the above-described arrangement will be described below.

The first steering actuator 14 is used in a usual state, and the second steering actuator 17 is used for backup when the first steering actuator 14 is defective. When the driver has operated the steering handle 23 in the usual state in which the first steering actuator 14 is functioning normally, the rotation of the first steering shaft 28 is transmitted through the universal joint 35, the second steering shaft 34 and the universal joint 38 to the third steering shaft 37, and a steering angle δ and a steering torque T are detected by the steering angle sensor Sa and the steering torque sensor Sb connected to the third steering shaft 37.

The steering angle δ detected by the steering angle sensor Sa, the vehicle speed V detected by the vehicle speed sensor Sc and the rack position P detected by the rack position sensor Sd are input to the first steering actuator electronic control unit Ua. The first steering actuator electronic control unit Ua drives the first steering actuator 14, so that a steering angle γ for the wheels W, W which is proportional to the steering angle δ of the steering handle 23 is provided, whereby the wheels W, W are steered through the steering gear box 11.

At this time, a feedback control is carried out so that the rack position P detected by the rack position sensor Sd (namely, the steering angle γ for the wheels W, W) is matched to a target position. For example, when the vehicle speed V detected by the vehicle speed sensor Sc is large, a target steering angle for the wheels W, W is decreased. When the vehicle speed V is small, the target steering angle for the wheels W, W is increased. Thus, it is possible to enhance the stability of the straight traveling of the vehicle at a high speed and to facilitate the management of the vehicle at a low speed.

In a steerage-by-wire type steering system, no steerage reaction force from the wheels W, W is applied to the steering handle 23 and hence, it is necessary to drive the steerage reaction force-generating means 39 by a command from the steerage reaction force-generating means electronic control unit Uc, thereby providing a steerage reaction force to the steering handle 23. In this case, a target steerage reaction force is searched from a map, using the steering angle δ detected by the steering angle sensor Sa and the vehicle speed V detected by the vehicle speed sensor Sc as parameters. This map is established so that the larger the steering angle δ, the larger the steerage reaction force is, and the larger the vehicle speed V, the larger the steerage reaction force is. The driving of the steerage reaction force-generating means 39 is controlled in a feedback manner, so that the steering torque T detected by the steering torque sensor Sb is matched to the target steerage reaction force. In this way, the sense of incompatibility of the driver can be eliminated by providing the pseudo steerage reaction force to the steering handle 23 by the steerage reaction force-generating means 39.

When the first steering actuator 14 is defective, the steering of the wheels W, W can be continued without hindrance by controlling the second steering actuator 17 in a similar manner by the second steering actuator electronic control unit Ub.

Now, when the driver grasps the left grip 24L by his or her left hand and the right grip 24R by his or her right hand to operate the steering handle 23, as shown in FIG. 2, portions of the left and right arms ahead of his or her elbows are substantially vertical to an upper half of the driver's body and hence, the driver can grasp the steering handle 23 in a natural posture. When the driver operates the steering handle 23 in a leftward turning direction about the axis Ls as shown in FIG. 5(B) from the neutral state shown in FIG. 5(A), the left grip 24L is rotated about the axis Lg in a counterclockwise direction toward the cover member 31, and the right grip 24 R is rotated about the axis Lg in the counterclockwise direction toward the cover member 31.

In this way, when the driver operates the steering handle 23 about the axis Ls in the leftward turning direction, the left and right grips 24L and 24R are rotated about the axis Lg in the opposite directions in operative association with each other. Therefore, left and right wrists of the driver are twisted naturally without labored angles, leading to an easy steering operation for the driver. A limit angle of rotation of the steering handle 23 about the axis Ls is suppressed to 90°, as shown in FIG. 5(C). In addition, because the interlocking mechanism 30 is formed by the left and right bevel gears 27L and 27R and the idler bevel gear 29, the left and right grips 24L and 24R can be rotated in the opposite directions in operative association with each other in a simple structure.

Additionally, because the axis Ls of the first steering shaft 28 rotated directly by the steering handle 23 is inclined to ascend forwards, the steering handle 23 is rotated in a plane substantially parallel to the upper half of the driver's body, and even if the steering handle 23 is rotated, the distance between the upper half of the driver's body and the grips 24L and 24R is maintained constant. Thus, it is unnecessary for the driver to stretch and withdraw his arms with the rotation of the steering handle 23, and it is possible for the driver to operate the steering handle 23 easily with the posture of the upper half of his or her body remaining maintained constant.

The operation of the steering handle 23 in the leftward turning direction has been described heretofore, and the same operation applies to a case when the steering handle 23 is operated in a rightward turning direction.

Embodiment 2

FIGS. 6 to 11 show a second embodiment of the present invention.

In the second embodiment, members or components corresponding to those in the first embodiment are designated by the same characters as in the first embodiment, and the overlapped description of them is omitted.

As shown in FIGS. 6 to 9, a steering handle 23 includes a left grip 24L grasped by a left hand of a driver and a right grip 24R grasped by a right hand of the driver. The left and right grips 24L and 24R are fixed through plate-shaped arms 46, 46 to rear ends of left and right rotary shafts 25, 25 disposed on left and right shafts AL and AR rotatable about their axes and inclined in a V-shape toward the driver. Each of the rotary shaft 25, 25 is supported for rotation about its axis on a circular housing 48 through a ball bearing 47, 47. Left and right bevel gears 49L and 49R are fixed to opposed ends of the left and right rotary shafts 25, 25, respectively, and meshed with a common stationary bevel gear 49C.

A first steering shaft 50 integrally fixed to the housing 48 is supported for rotation about an axis through a pair of ball bearings 54, 54 in a rear column cover 53 fixed to a rear end of a front column cover 51 by bolts 52. A support shaft 56 integral with the stationary bevel gear 49C is fixed to a rear end of a stay 55 fixed to a lower surface of the rear column cover 53. Therefore, the stationary bevel gear 49C is non-rotatably supported on the rear column cover 53. Rotational axes AL and AR of the left and right grips 24L and 24R intersect a rotational axis A lying on the first steering shaft 50 at an acute angle (35° in the embodiment). Namely, the left and right rotational axes AL and AR intersect each other at an angle of 70° on opposite sides of the rotational axis A.

A second steering shaft 58 coupled to a front end of the first steering shaft 50 by bolts 57 is rotatably supported in the front column cover 51 through a ball bearing 42. A steering angle sensor Sa for detecting a steering angle δ input to the steering handle 23 by the driver is mounted at a front end of the second steering shaft 58, and a steering torque sensor Sb for detecting a steering torque T input to the steering handle 23 by the driver is mounted at an intermediate portion of the second steering shaft 58. A steerage reaction force-generating means 39 is also mounted at the intermediate portion of the second steering shaft 58. The steerage reaction force-generating means 39 provides a pseudo steerage reaction force to the steering handle 23 by an electric motor or a hydraulic pressure, and the direction and magnitude of the steerage reaction force can be controlled to any values by the meshing of a driving gear 40 provided on an output shaft with a follower gear 41 provided on the second steering shaft 58.

The operation of the second embodiment having the above-described arrangement will be described below.

When the steering handle 23 is operated about the rotational axis A in a leftward turning direction from a neutral state shown in FIG. 11(A), as shown in FIG. 11(B), the left grip 24L is rotated about its rotational axis AL in a counterclockwise direction, and the right grip 24R is also rotated about its rotational axis AR in the counterclockwise direction.

In this way, when the steering handle 23 is rotated about the rotational axis A in the leftward turning direction, the left and right grips 24L and 24R are rotated about their rotational axes AL and AR in the same direction in operative association with each other. Therefore, left and right wrists of the driver are twisted naturally without labored angles, leading to an easy steering operation for the driver. A limit angle of rotation of the steering handle 23 about the rotational axis A is suppressed to 90°, as shown in FIG. 11(C). In addition, an interlocking mechanism 30 for the left and right grips 24L and 24R is formed by the left and right bevel gears 49L and 49R and the stationary bevel gear 49C, the left and right grips 24L and 24R can be rotated about their rotational axes in the same direction in operative association with each other in a simple structure.

Figure 10:
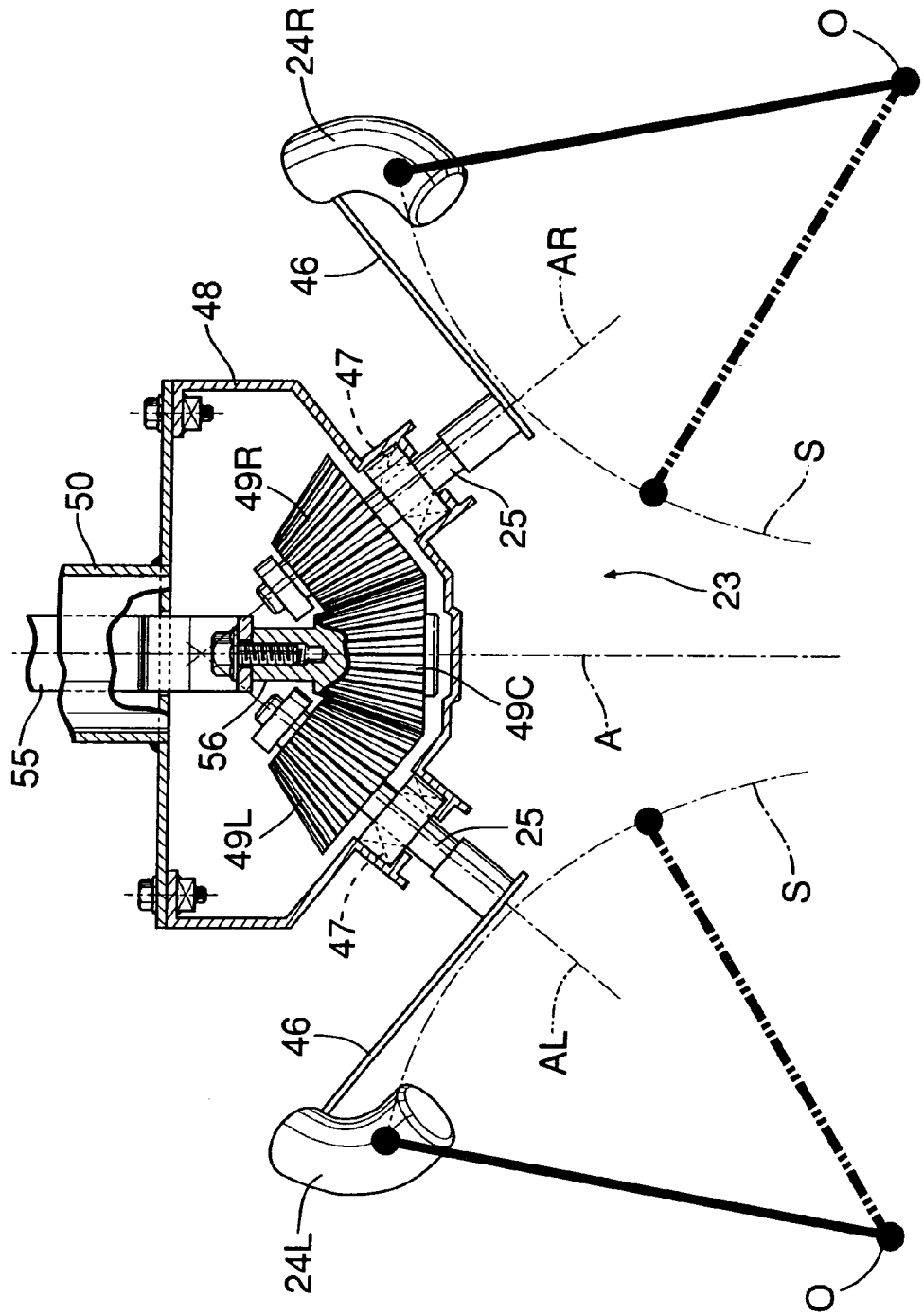
FIG. 10 is a sectional view taken along a line 10-10 in FIG. 8. (Embodiment 2)
Figure 11:
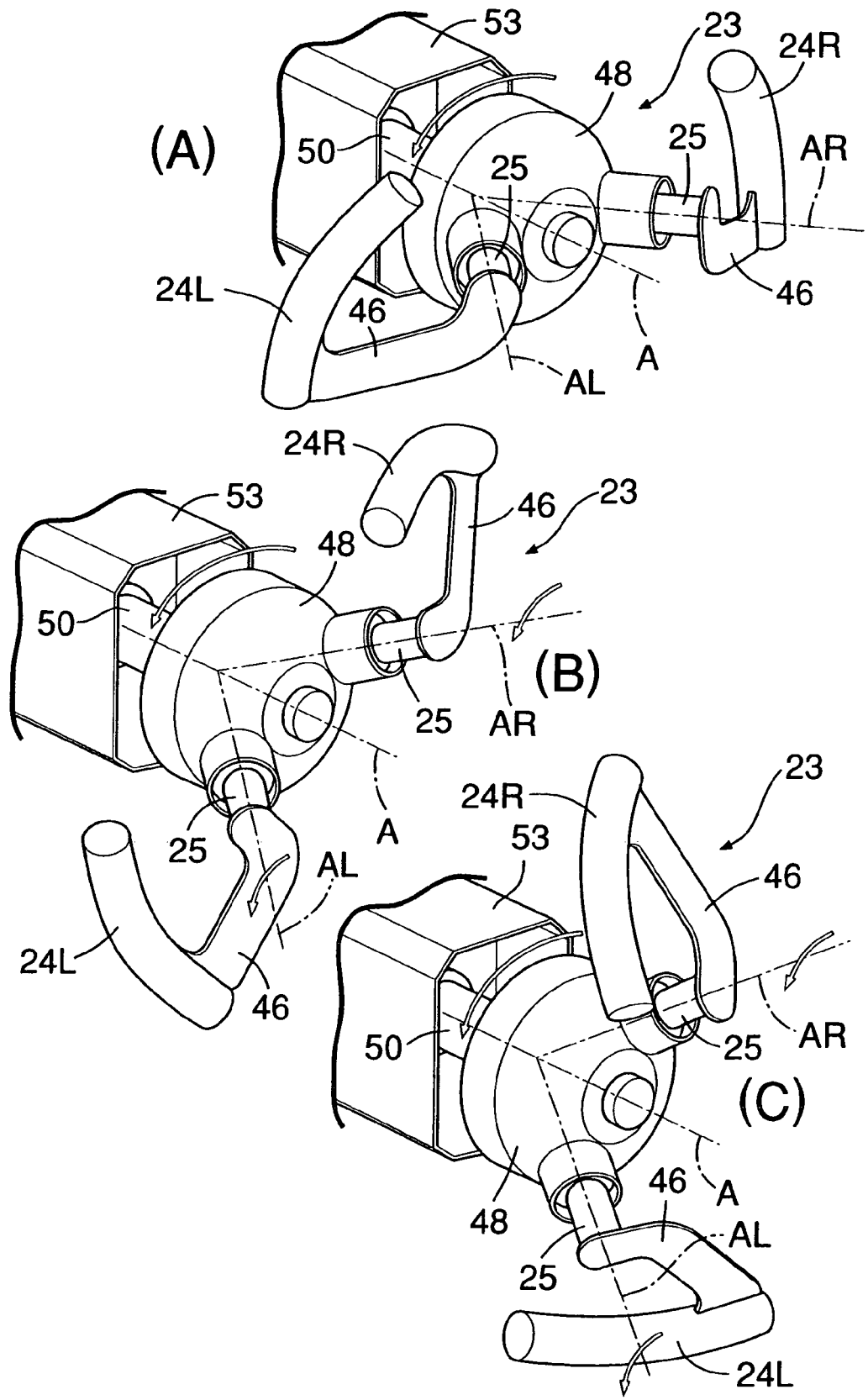
FIG. 11 is views for explaining the operation upon operation of a handle in a leftward turning direction. (Embodiment 2)

Additionally, the left and right rotational axes AL and AR are inclined to spread in a V-shape toward the driver, and hence, when the left and right grips 24L and 24R are moved upwards from neutral positions, they are moved in a direction toward the driver and moved on spherical planes S, S about positions O, O of the driver's elbows, as shown in FIG. 10. Thus, it is possible for the driver to operate the steering handle 23 by moving only his or her hands and arm portions ahead of his or her elbows with the positions of his elbows remaining fixed, leading to an easy steering operation.

The operation of the steering handle 23 in the leftward turning direction has been described heretofore, and the same operation applies to a case when the steering handle 23 is operated in a rightward turning direction.

Although the embodiments of the present invention have been described above, it will be understood that various modifications in design can be made without departing from the subject matter of the present invention.

For example, the present invention is not limited to the steerage-by-wire type steering system and is also applicable to a shaft-type steering system in which a steering handle and a steering gear box are connected by a shaft, and a cable-type steering system in which a steering handle and a steering gear box are connected by a cable.

In the first embodiment, the first steering shaft 28 is disposed so that it is inclined to ascend forwards at the angle of 30°, but the angle is not limited to 30°.

Further, in the second embodiment, the rotational axes AL and AR of the left and right grips 24L and 24R form 70° with each other and this angle is not limited to 70°.

Furthermore, the steering handle and steering system of the present invention are not limited to the use for vehicles and can be applied to all the traveling carriages including ships and aircraft.

What is claimed is:

1. A steering system for carrying out steering of a vehicle in response to rotation of a steering handle;
    said steering system comprising
        a plurality of steering shafts operatively connected with each other;
    wherein, during all positions of the steering system, an axis of at least one of the steering shafts that is closest to the steering handle is inclined upwardly as it extends in a forward direction of said vehicle.

2. A steering system for carrying out steering of a vehicle in response to rotation of a steering handle; said steering system comprising a steering shaft;
    wherein
    said steering handle includes
        a left grip, and
        a right grip,
    wherein said left grip and said right grip are rotatable about an axis perpendicular to an axis of said steering shaft for selectively performing a leftward steering or a rightward steering of said vehicle;
    wherein, during steering operation, said left grip and said right grip are rotated in an operative association with each other, and in directions opposite to each other so that said left grip and said right grip move twistedly relative to each other.

3. A steering system according to claim 2, wherein said left grip and said right grip are connected to each other by an interlocking mechanism so as to be rotated in said opposite directions from each other.

4. A steering system according to claim 3, wherein the interlocking mechanism is formed by a left bevel gear fixed to the left grip, a right bevel gear fixed to the right grip, and an idler bevel gear meshed simultaneously with the left bevel gear and the right bevel gear.

5. A steering system according to claim 2, wherein said axis of said steering shaft is inclined at about 30° from a horizontal plane.

6. A steering system according to claim 1, wherein said at least one of the steering shafts is inclined at about 30° from a horizontal plane.

7. A steering system according to claim 1, wherein said steering system is a steer-by-wire steering system.

8. A steering system for a vehicle, comprising
    left and right operating members,
    actuators for steering said vehicle, and
    control units for controlling the operation of said actuators in response to the operation of said operating members,
    wherein a locus of operative movement of each of said operating members is on a respective spherical plane about a respective predetermined position which is rearward of the steering system;
    wherein during steering operation, each of the left and right operating members is rotated in a same direction around respective rotational axis thereof.

9. A steering system for a vehicle, comprising
    left and right operating members,
    actuators for steering said vehicle, and
    control units for controlling the operation of said actuators in response to the operation of said operating members,
    wherein both of said operating members, when being moved upwards from their neutral positions, are moved in a direction outwardly from said neutral positions thereof, and rearwardly.

10. A steering system for a vehicle, comprising
    a steering shaft;
    left and right operating members,
    actuators for steering said vehicle, and
    control units for controlling the operation of said actuators in response to the operation of said operating members,
    wherein said left and right operating members are rotatable about their left and right rotational axes, while being rotated about a steering rotational axis of said steering shaft, and
    wherein during all positions of the steering system, said left and right rotational axes extend from said steering rotational axis to spread in a V-shape.

11. A steering system according to claim 10, wherein said left and right rotational axes of said left and right operating members are arranged such that they form an angle of approximately 70° with each other.

* * * * *